United States Patent Office.

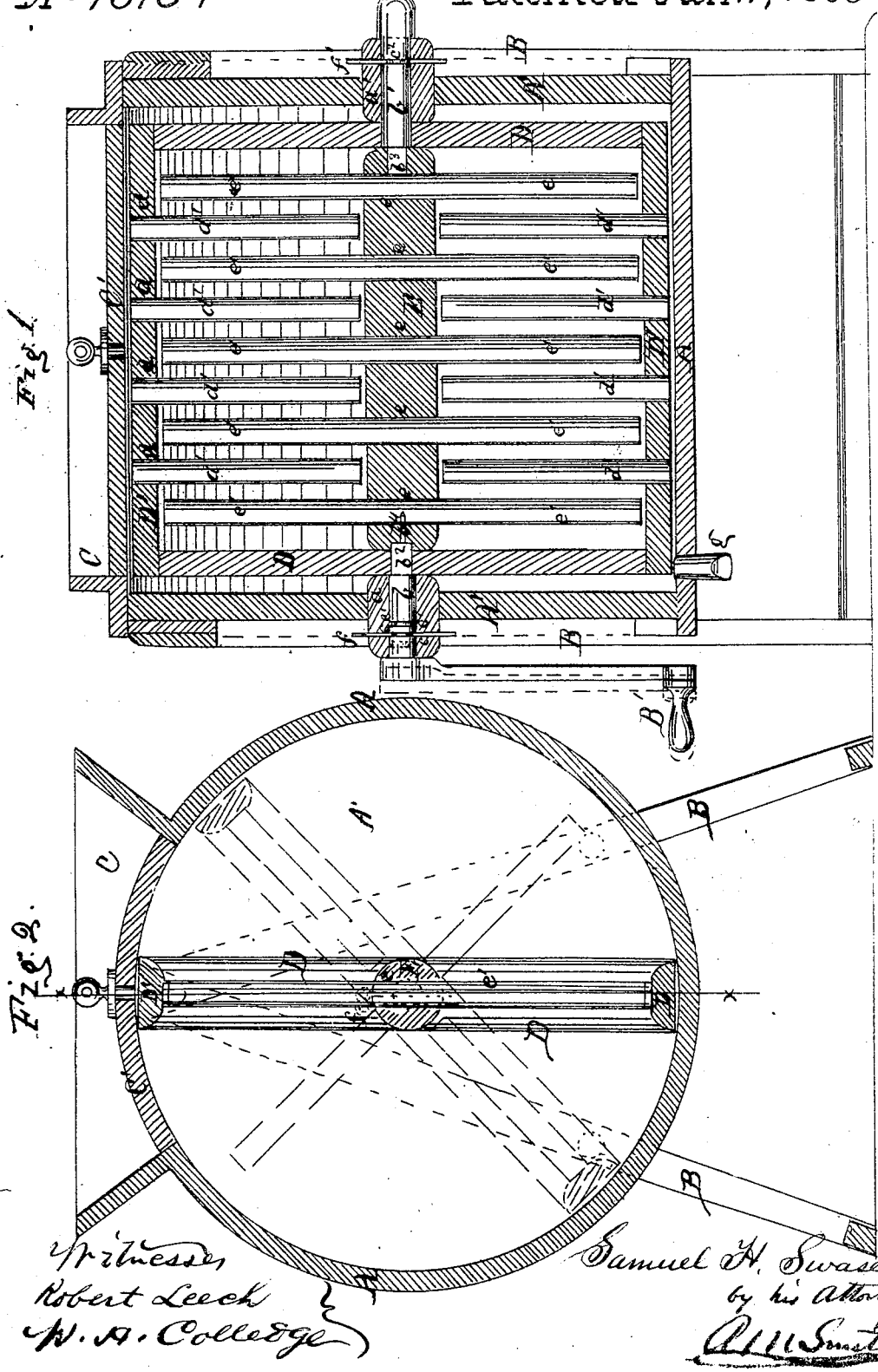

SAMUEL H. SWASEY, OF MORRISTOWN, VERMONT.

Letters Patent No. 73,134, dated January 7, 1868.

IMPROVEMENT IN BARREL-CHURNS.

*The Schedule referred to in these Letters Patent and making part of the same.*

TO ALL WHOM IT MAY CONCERN:

Be it known that I, SAMUEL H. SWASEY, of Morristown, county of Lamoille, and State of Vermont, have invented certain new and useful Improvements in Barrel-Churns; and I do hereby declare the following to be a full, clear, and exact description thereof, reference being had to the accompanying drawings, making a part of this specification, in which—

Figure 1 is a longitudinal vertical section of my improved churn taken in line $x\,x$, fig. 2, and Figure 2 is a transverse vertical section of the same.

Similar letters of reference denote corresponding parts in both figures.

My invention consists in the employment of a float-frame in connection with the barrel or cylinder of the churn, and a central float-arbor, in such manner as to nearly or quite fill the diameter of the churn or cylinder, and provided with radial floats extending to or nearly to the central float-arbor, as hereinafter described.

It further consists in a central float-arbor provided with floats alternating with the floats on the float-frame, and so arranged that it may be made to rotate therewith or held stationary when desired; and It further consists in the means for adjusting or controlling the float-frame and arbor, whereby they may be set in the same plane or at right angles to each other for operation, and whereby the frame is made to rotate while the arbor and its floats are held stationary, as hereinafter described.

To enable others to understand and use my invention, I will proceed to describe it with reference to the drawings, in which—

A represents the barrel or cylinder, which may be made of any suitable material and in any desired or usual manner, and is mounted in the end uprights or framing, B, which may be of any suitable construction for the proper support, at the required height from the ground, of the barrel A. C is an opening in the top of the barrel, which may be made with flaring sides, or funnel-shaped, as shown in fig. 2; and C′ is the cover, made close-fitting to prevent the splashing or waste of the cream in the operation of churning, and which is made removable for the insertion of the cream into the cylinder or the removal of the butter therefrom. The heads or ends of the barrel or cylinder, denoted by A′, are perforated centrally to receive the hubs or journal-boxes $a\,a^1$, which form bearings for the stud-axles or pivots $b\,b^1$, hereinafter explained. D is a rectangular float-frame, consisting of the sides D and cross-pieces or bars D′, said sides and ends being made in a semi-cylindrical or other suitable form, as shown in fig. 2, and secured together by dove-tailing, by means of a single bolt at each corner, or in any other desired manner. The sides D are made of a length corresponding to the diameter of the barrel, and are intended to rotate in close proximity to the heads or ends thereof, so that when the cross-pieces or ends D′ of the frame are dove-tailed, or secured thereon in close proximity to the inner surface of the cylinder, the float-frame shall extend across the diameter, and from end to end of the cylinder or barrel, and when rotated, as hereinafter described, shall move in close proximity to and sweep the entire inner surface of the cylinder. The cross-pieces D of the frame are perforated at $d$, and provided with any desired number of floats, $d$, which are made round or in any other desired or suitable form, and arranged radially to the cylinder and parallel to the sides D, and which extend inward to a point nearly touching the surface of a central float-arbor or drum, E. This drum or arbor E is of a length equal to the distance between the sides or ends D D of the float-frame, and is arranged in relation thereto in the manner shown by the drawing, and is perforated as shown at $e$, and provided with a series of diametrical or radial floats, $e^1$, arranged so as to lie in the spaces between, with the floats $d'$ of the float-frame, or, in other words, so as to alternate therewith, as shown in fig. 1. These floats, like those of the float-frame, may be made of any desired form, though the round float represented by the drawing, it is believed, will be found the most efficient in practice, and therefore generally preferred, as they are readily turned, at a trifling cost, and may be easily and readily replaced when worn or broken. The float-frame and arbor are perforated at their ends, to receive the ends of the stub-axles or crank-shaft and pivot, in a manner that will now be explained. Each end of the arbor is provided with a square socket, into which the squared ends $b^2\,b^3$ of the shaft and pivot fit, during the operation of churning, &c., in the manner shown by full lines, fig. 1. The end of said arbor next the crank-shaft is further pierced centrally, to receive a small pin or pivot, $b^4$, arranged centrally to shaft $b$, and operating as hereinafter explained. The sides D of the float-frame are also perforated to receive the shaft and pivot $b\,b^1$, the perforation at the crank-side being made square, and fitting the squared end $b^2$ of the crank-shaft in such a manner as to be caused to turn therewith when the said shaft is rotated; while the perforation at the outer or pivot side is made circular, in such manner as to fit upon a circular portion of the pivot $b^1$, and allow the frame to turn freely thereon, for a purpose hereinafter explained. The crank-shaft $b$ is provided with the squared end $b^2$, passing through the square perforation in the float-frame, and into the squared socket in one end of the float-arbor, and with the grooves $c\ c^1$, into one or the other of which a pin, $f$, passes, through a perforation in the hub $a$, to hold the shaft in the desired relation to the float-frame. The pin or pivot at the opposite side of the churn is also provided with a squared end, fitting in a corresponding socket in the adjacent end of the float-arbor, and with an external groove, $c^2$, and a central perforation, in one or the other of which a pin, $f^1$, is inserted through one of two perforations in the hub $a^1$, for holding the pin $b^1$ in place, and allowing it to rotate with the rotation of the crank F and float-frame and arbor, or to be held stationary, thereby holding the float-arbor and preventing its rotation with the float-frame, in a manner which will now be explained, in describing the operation, which is as follows, viz:

The milk or cream to be operated upon having been placed in the churn, and the cover being put in place, the float-frame and arbor are adjusted to a position at right angles to each other, in the manner shown by red lines, fig. 2, and the crank-shaft forced inward into position shown in black lines, fig. 1. The pin $f$ is then placed in groove $c$, in such manner as to hold the squared end of the shaft in the socket in the float-arbor, and thereby cause said arbor to rotate with the shaft. The pin $f^1$ is placed in the external groove in the pivot or shaft $b^1$, so as to hold said shaft in place, while at the same time it is left free to rotate with the frame and arbor when the crank B' is rotated in the operation of churning. This relation and rotation of parts is continued until the butter is formed, when the arbor and frame are adjusted to bring the floats into the same plane, interlocking with each other, and forming a close rack, as shown by the full black lines in the drawing, by slightly withdrawing the shaft $b$, releasing the arbor, and turning it into the same plane with the frame, and adjusting it and the retaining-pin $f$ as before, when the two series of floats, forming a close rack, serve, by their further rotation, to gather the butter. When this is sufficiently accomplished, its movement over the bottom of the barrel serves to withdraw all the butter therefrom, when, by removing the plug $g$ in said bottom, the buttermilk is readily drawn off without obstructions from or loss of butter. The shaft $b$ is now drawn out, releasing the float-arbor from the squared end of the shaft, and allowing it to rest upon and be supported by pin or round extension $b^1$, and pin $f$ is inserted in groove $c^1$. The pin $f^1$ is withdrawn from groove $c^2$ in the outer pivotal support $b^1$, and is inserted through a central perforation therein, and through a corresponding perforation in the hub $a^1$, in such a manner as to prevent the rotation thereof, and consequently through its squared end of the float-arbor E. The cover being removed, the required quantity of salt is placed in the churn with the butter, when, by the rotation of the float-frame, the floats thereon pass between and in close proximity to the stationary floats of the float-arbor, carrying the contents of the churn with them, and effecting a thorough and rapid working of the butter and mixing of the salt therewith, after which the float-frame and arbor are again adjusted to bring the floats into the same plane, and are rotated, bringing the butter in a compact roll upon the close rack formed thereby, into convenient form and position for removal from the churn.

Having thus fully described the construction and operation of my improved churn, what I claim as new, and desire to secure by Letters Patent, is—

1. A float-frame, made to fill or nearly fill the diameter of the barrel or churn, when provided with floats extending to or nearly to the central float-arbor, and operating in connection with said float-arbor, substantially as described.

2. The central float-arbor, provided with floats alternating with those on the float-frame, so arranged that it may be made to rotate with the float-frame, or held stationary, when desired, substantially as and for the purposes described.

3. The means for adjusting or setting the float-frame and float-arbor, whereby the floats may be set or held in the same plane with or at right angles to each other, for the purposes and substantially as described.

4. The adjustable shaft $b$, provided with the squared end, and with the grooves $c\ c^1$, for controlling the relative operation of the float-arbor and frame, substantially as described.

5. The grooved perforated pivot $b^1$, provided with the squared end fitting in the float-arbor, whereby said arbor may be held stationary for working the butter, substantially as described.

In testimony whereof, I have hereunto subscribed my name, this 8th day of July, 1867.

<div style="text-align: right">SAM. H. SWASEY.</div>

Witnesses:
  HOBART H. SMITH,
  EDM. F. BROWN.